United States Patent
Yamamoto et al.

(10) Patent No.: US 7,164,559 B2
(45) Date of Patent: Jan. 16, 2007

(54) HEAD ACTUATOR WITH ELASTIC MEMBERS ORIENTED AT OBTUSE ANGLES RELATIVE TO AN ARM AND HARD DISK APPARATUS EQUIPPED WITH SAME

(75) Inventors: Kazuyuki Yamamoto, Kanagawa (JP); Takashi Yamada, Tokyo (JP); Masami Miike, Tokyo (JP); Kazutoshi Yamamoto, Tokyo (JP); Toshio Mamiya, Tokyo (JP)

(73) Assignee: Sony Corporation (JP)

( * ) Notice: Subject to any disclaimer, the term of this patent is extended or adjusted under 35 U.S.C. 154(b) by 455 days.

(21) Appl. No.: 10/684,459

(22) Filed: Oct. 15, 2003

(65) Prior Publication Data

US 2004/0114277 A1 Jun. 17, 2004

(30) Foreign Application Priority Data

Oct. 18, 2002 (JP) .............................. P2002-304832

(51) Int. Cl.
  *G11B 5/55* (2006.01)
  *G11B 5/48* (2006.01)
(52) U.S. Cl. .............................. 360/265.9; 360/244.6; 360/244.7
(58) Field of Classification Search ............. 360/244.5, 360/244.6, 244.7, 265.9
See application file for complete search history.

(56) References Cited

U.S. PATENT DOCUMENTS

| 4,300,176 | A | * | 11/1981 | Gilovich et al. | ......... 360/264.8 |
| 4,439,792 | A | * | 3/1984 | van de Bult | ............. 360/265.1 |
| 5,646,802 | A | * | 7/1997 | Akiyama et al. | ........ 360/244.6 |
| 5,657,531 | A | * | 8/1997 | Sato et al. | ............... 360/244.6 |
| 6,151,190 | A | * | 11/2000 | Yamamoto et al. | ...... 360/99.02 |

FOREIGN PATENT DOCUMENTS

JP 10-125014 5/1998

* cited by examiner

*Primary Examiner*—Craig A. Renner
(74) *Attorney, Agent, or Firm*—Rader Fishman & Grauer PLLC; Ronald P. Kananen

(57) ABSTRACT

A head actuator is made thinner without sacrificing its strength to thereby achieve the thinning of a hard disk apparatus. On the base end of each of two suspensions is provided a boss that protrudes in the direction of the side on which a magnetic head is provided, and a suspension fixing section having a hole into which the bosses are inserted is formed towards the tip of an arm. The boss of one of the suspensions is inserted into the hole from the upper end section thereof, and the boss of the other suspension is inserted into the hole from the lower end section thereof. Thus, the arm is fixed in place by being held by the two suspensions from above and below.

7 Claims, 13 Drawing Sheets

HEAD ACTUATOR WITH ELASTIC MEMBERS ORIENTED AT OBTUSE ANGLES RELATIVE TO AN ARM AND HARD DISK APPARATUS EQUIPPED WITH SAME

CROSS REFERENCE TO RELATED APPLICATIONS

The present document claims priority to Japanese Priority Document JP2002-304832, filed in the Japanese Patent Office on Oct. 18, 2002, the entire contents of which are incorporated herein by reference to the extent permitted by law.

BACKGROUND OF THE INVENTION

1. Field of the Invention

The present invention relates to a head actuator in which a magnetic head is attached to a rotatable arm by way of an elastic member, a hard disk apparatus equipped with a head actuator, as well as a method of manufacturing a head actuator. More particularly, the present invention seeks to provide a thinner head actuator, and thus a thinner hard disk apparatus, by way of a configuration in which two elastic members are attached to an arm in such a manner that the arm is positioned between the elastic members.

2. Description of the Related Art

FIGS. 11A and 11B are plan views showing configuration examples of conventional hard disk apparatuses (HDDs), where FIG. 11A shows a fixed hard disk apparatus and FIG. 11B shows a removable hard disk apparatus. In a conventional hard disk apparatus 51, magnetic heads 53 for recording and reading information on a disk 52, suspensions 54 for supporting these magnetic heads 53 on one end, and a head actuator 56 including an arm 55 for keeping these suspensions 54 fixed in place are incorporated. The shape of the conventional head actuator 56 is such that it is symmetrical with respect to straight line C–C drawn through the center of a pivot 57 and the magnetic head 53. A head actuator with such a shape is also referred to as an in-line head actuator.

In the removable hard disk apparatus 51, the disk 52 is housed inside a disk cartridge 58, and is freely removable from the body of the apparatus. FIG. 12 is a sectional view showing a configuration example of the main portion of a conventional disk apparatus. In addition, FIG. 12 is a sectional view along line D—D in FIG. 11B.

In the in-line head actuator 56, as shown in FIGS. 11A and 11B, when the head actuator 56 is rotated to a point where the magnetic heads 53 reach the innermost portion of the disk 52, the tip of the arm 55 interferes with the disk 52. Therefore, in order to avoid this interference with the disk 52, the arm 55 is shaped, as shown in FIG. 12, such that its tip is bifurcated. Bosses 59 of the suspensions 54 are mounted on the tips of upper and lower blocks 55a and 55b of the bifurcated tips such that the tip portions of the bosses 59 face outward, and they are fixed in place through caulking or adhesion.

Therefore, in the conventional head actuator 56, because a certain thickness is necessary for each of the tip portions of the bifurcated arm 55 in order to maintain enough strength, the actuator 56 as a whole inevitably becomes thicker, and thus therein lies a problem in that it also becomes difficult to make the hard disk apparatus 51 equipped with this head actuator 56 thinner.

Further, with respect to a removable hard disk apparatus that uses the conventional head actuator 56, as shown in FIG. 12, along with the head actuator 56, the disk cartridge 58 inevitably becomes thicker as well. In other words, because the bifurcated tip portions of the arm 55 interfere with the disk 52 and the disk cartridge 58, it is difficult to make the disk cartridge 58, and thus the apparatus as a whole, thinner.

On the other hand, in recent years, as hard disk apparatuses are built into an increasing number of portable devices, there is a demand for thinner drive apparatuses, and thus it is desired that head actuators be made as thin as possible.

In addition, in the head actuator 56, in order to fix the suspension 54 onto the arm 55, ball caulking has been used conventionally. FIGS. 13A and 13B show an example of a conventional fixing process. In conventional methods of fixing the suspensions 54 in place by way of ball caulking, as shown in FIG. 13A, bosses 59 are positioned in each of the blocks 55a and 55b of the bifurcated arm 55 such that the tip portions of the bosses 59 face outward. Then, as shown in FIG. 13B, an intermediate support member 60 is positioned between the bifurcated arm 55, the arm 55 is held by and between support members 61a and 61b, and a caulking ball 62 (a steel ball), which is slightly larger than the diameter of the hole in the bosses 59 of the suspensions 54, is pressed thereinto and is made to pass therethrough. In so doing, by having the bosses 59 of the suspensions 54 stretched in the radial direction by the caulking ball 62, the suspension 54 is fixed to the arm 55.

However, in trying to make the conventional head actuator 56 thinner, because the tip portion of the arm 55 is bifurcated, the upper and lower blocks 55a and 55b lack strength (i.e. thickness), and deformation was easily caused by the caulking process. As the caulked portion gets deformed, the load with which the magnetic heads 53 are pressed against the disk 52 changes, an appropriate flying height cannot be secured, thereby causing problems in reading and recording signals.

Further, the conventional head actuator 56, during its manufacturing process, has to have the intermediate support member 60 inserted between the blocks 55a and 55b of the bifurcated arm 55. However, because the magnetoresistive head element of the magnetic heads 53 is sensitive to shock, dust, static electricity and the like, jigs such as this intermediate support member 60 have to be handled with great care so that they do not contact the magnetic heads 53, which hinders assembly efficiency during the caulking process, and there is a problem in that it is costly.

Meanwhile, a hard disk apparatus having a head actuator bent in the shape of an L is proposed (see patent document 1, for example).

SUMMARY OF THE INVENTION

As described above, in conventional hard disk apparatuses, it was difficult to make the head actuator thinner without sacrificing strength, and thus, it was difficult to make the hard disk apparatus thinner, or, in the case of a removable hard disk apparatus, to make the disk cartridge thinner.

In view of such a problem, it is possible to make the head actuator thinner using, as disclosed in patent document 1, a head actuator that is not of an in-line type.

In other words, the present invention addresses the problems described above, and seeks to provide a head actuator and a hard disk apparatus that can be made thinner without sacrificing strength, as well as a method of manufacturing a head actuator.

A head actuator according to an embodiment of the present invention has two plate-shaped elastic members attached towards the tip of an arm having a rotary drive section with a gap between the elastic members, and a magnetic head is supported at the tip of each of the elastic members. On the other end of each of the elastic members, there is provided a boss that protrudes in the direction of the side on which the magnetic head is provided. Also, a fixing section having a hole into which the bosses are placed is formed towards the tip of the arm. The boss of one of the elastic members is inserted from one end of the hole, and the boss of the other elastic member is inserted from the other end of the hole so as to fix the fixing section in place by holding it between the elastic members. Further, the elastic members have a shape that is bent with respect to the arm.

In the above head actuator related to an embodiment of the present invention, the two elastic members, to which the magnetic heads are attached, are attached so as to hold therebetween the fixing member of the arm. Thus, the tip section of the arm can be formed in a single block, and it becomes possible to make the head actuator thinner. In addition, by forming the tip section of the arm in a single block, the head actuator can be made more rigid.

A hard disk apparatus related to the present invention is one into which the head actuator described above is incorporated. In other words, the hard disk apparatus has a head actuator in which two plate-shaped elastic members are attached towards the tip of an arm having a rotary drive section with a gap between the elastic members, and a magnetic head is supported at the tip of each of the elastic members so that the magnetic heads are provided on both sides of a single disk. In this hard disk apparatus, on the other end of each of the elastic members, there is provided a boss that protrudes in the direction in which the magnetic head is provided. Also, a fixing section having a hole into which the bosses are inserted is formed towards the tip of the arm. The boss of one of the elastic members is inserted from one end of the hole, and the boss of the other elastic member is inserted from the other end of the hole so as to fix the fixing section in place by holding it between the elastic members. Further, the head actuator has a form in which each of the elastic members is bent towards the disk with respect to the arm.

In the above hard disk apparatus related to an embodiment of the present invention, by rotating the head actuator with the rotary drive section wile rotating the disk, data is read or written with the magnetic heads while the magnetic heads move inward from the outside, or outward from the center.

The two elastic members, to which the magnetic heads are attached, are attached so as to hold therebetween the fixing section of the arm. In addition, by making the head actuator have a shape in which the elastic members are bent towards the disk with respect to the arm, interference between the arm and the disk can be prevented even in cases where the head actuator is rotated so as to place the magnetic heads towards the inner side of the disk. Thus, the tip section of the arm can be formed in a single block, and it becomes possible to make the head actuator thinner. As a result, a thinner hard disk apparatus can be realized.

In addition, by forming the tip section of the arm in a single block, the head actuator can be made more rigid. Therefore, the positioning accuracy of the magnetic heads improves with respect to the acceleration by the driving force of the rotary drive section, and drive performance improves.

In a method of manufacturing a head actuator related to an embodiment of the present invention, two plate-shaped elastic members each having a magnetic head are attached towards the tip of an arm with a gap between the elastic members. A boss provided on one of the elastic members is inserted from one end of a hole in a fixing section provided towards the tip of the arm, and a boss provided on the other elastic member is inserted from the other end of the hole in the fixing section. Each boss is caulked so as to be fixed to the fixing section.

In the method of manufacturing a head actuator above related to an embodiment of the present invention, each boss is caulked in a state where the fixing section of the arm is held by and between the two elastic members. Thus, there is no need to insert a jig between the two elastic members between which there is only a narrow gap, deformation of the arm or the elastic members can be prevented, and the head actuator can be assembled with precision.

In addition, by thus making it unnecessary to insert a jig between the elastic members, problems such as, for example, getting the magnetic heads damaged when inserting the jig can be prevented, the yield can be improved, and costs can be cut.

DETAILED DESCRIPTION OF THE PREFERRED EMBODIMENTS

Figure 1:
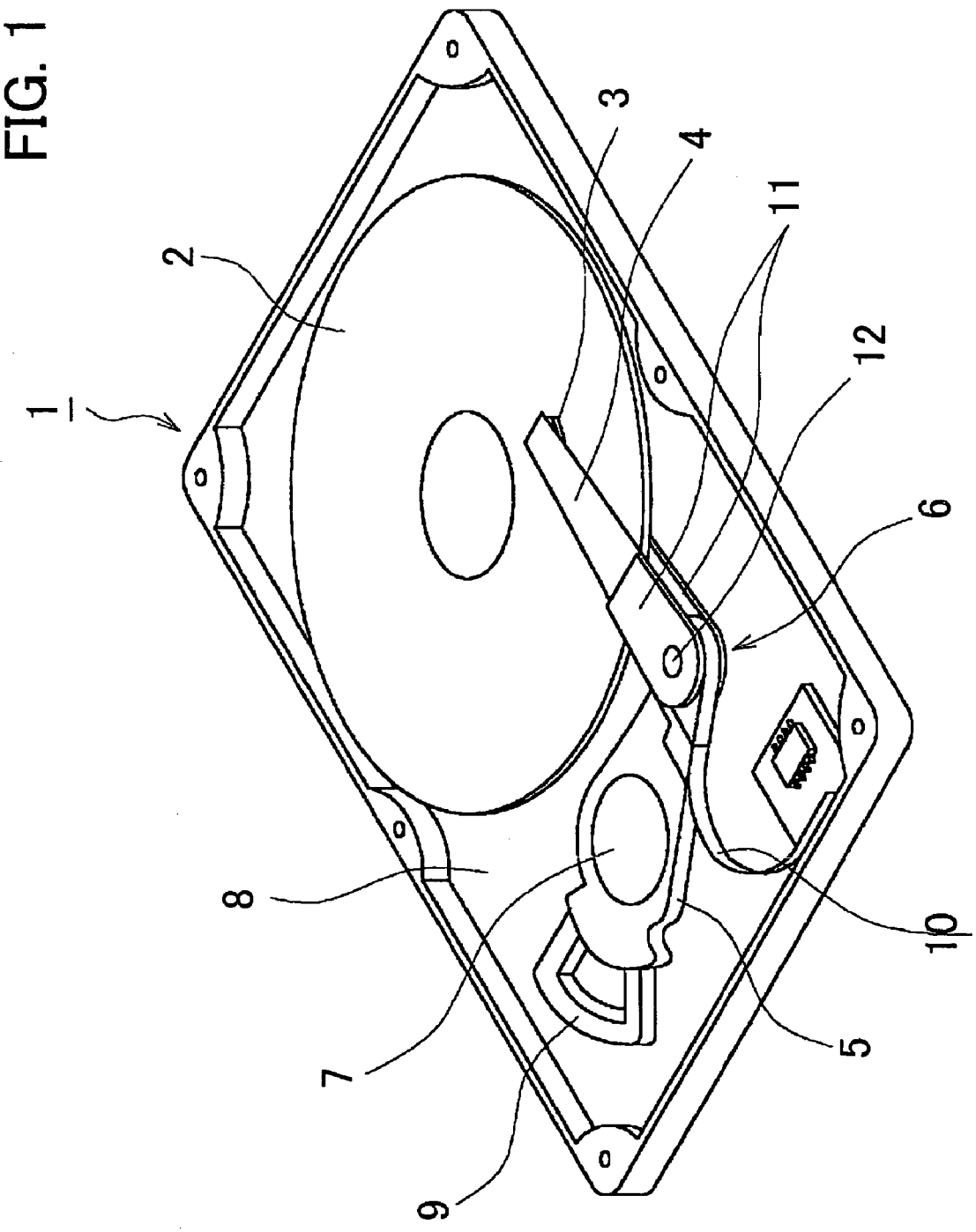
FIG. 1 is a perspective view showing a configuration example of a hard disk apparatus of a first embodiment.
Figure 2A:
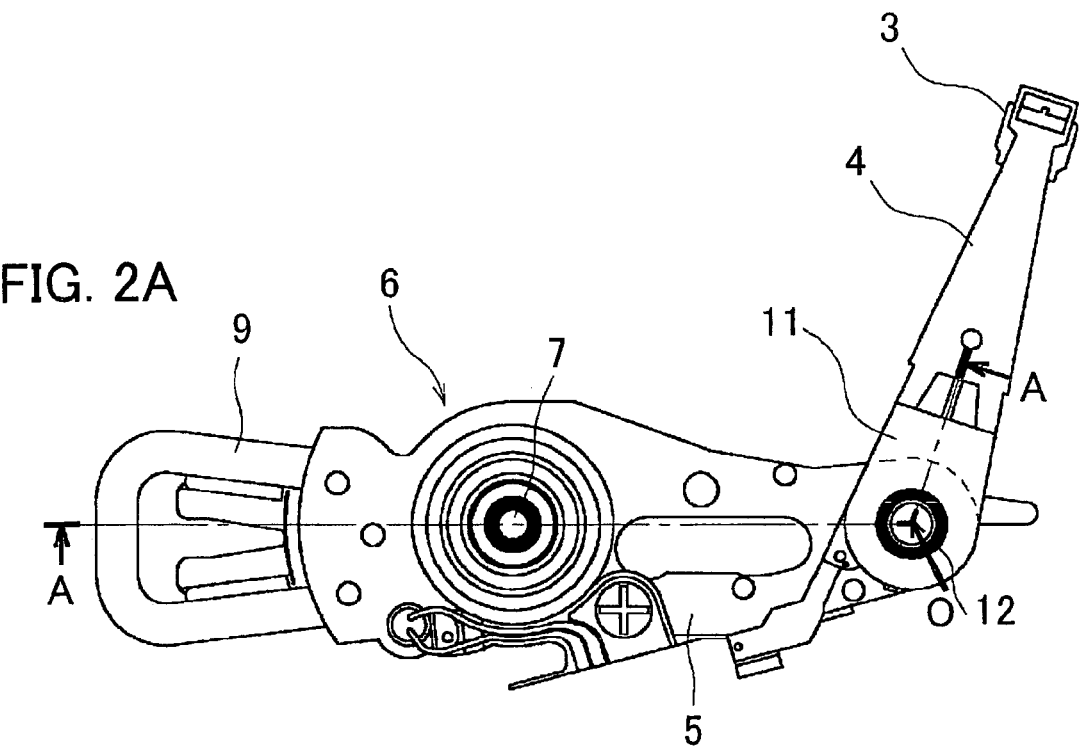
FIGS. 2A and 2B are diagrams illustrating a configuration example of a head actuator in the embodiment above.

Embodiments of head actuators, hard disk apparatuses, as well as methods of manufacturing a head actuator related to the present invention will be described with reference to the drawings. FIG. 1 is a perspective view showing a configuration example of a hard disk apparatus of a first embodiment, and FIG. 2 is a diagram illustrating a configuration example of a head actuator in this embodiment. In FIG. 1, a cover, which is not shown in the drawing, is removed in order to show the internal structure of the hard disk apparatus. FIG. 2A is a plan view, and FIG. 2B is a sectional view along line A-O-A in FIG. 2A.

Figure 2B:
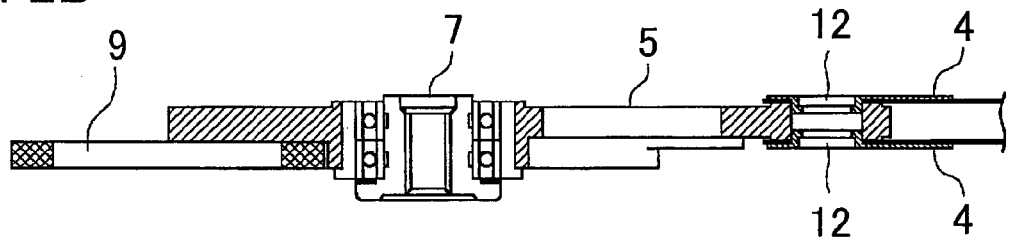

A hard disk apparatus 1 of the first embodiment is equipped with a head actuator 6, such as the one shown in FIGS. 2A and 2B, which includes magnetic heads 3 for recording/reading information to/from a disk 2, suspensions 4 as elastic members for supporting the magnetic heads 3 at the side towards the tips of the suspensions 4, and an arm 5 fixed to these suspensions 4. A configuration in which the two suspensions 4 are attached so that the arm 5 is held by and between these suspensions 4 from above and below is adopted, and thus, the head actuator 6 is made thinner.

The head actuator 6 is attached in such a manner that the arm 5 is rotatable with respect to a housing 8 with a pivot 7 at the center. The head actuator 6 is rotated by a voice coil motor 9 as a rotary drive section that is provided on the side of the pivot 7 opposite the side on which the suspensions 4 are provided. The supplying of power to the head actuator 6 and the communication of signals with the magnetic heads 3 are performed via a flexible printed board 10 fixed to the arm 5.

Figure 3A:
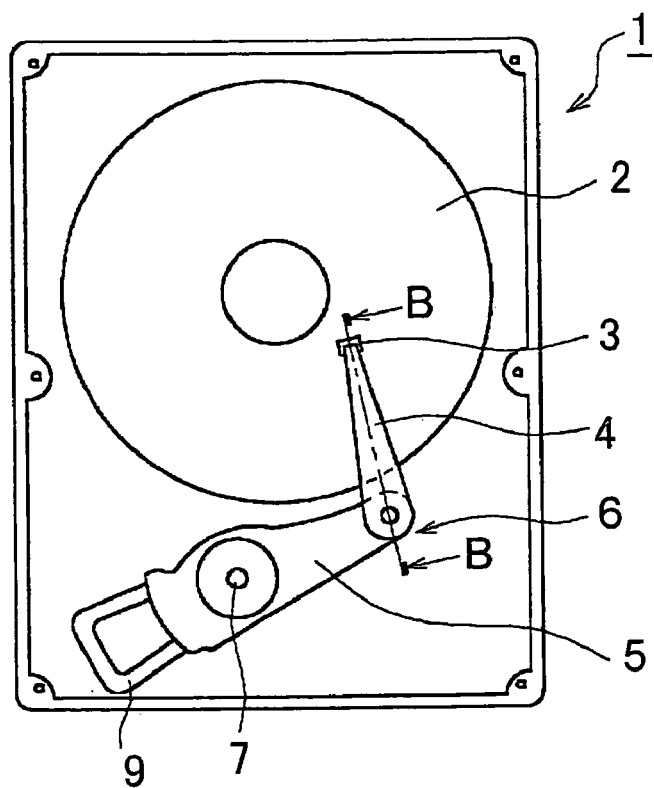
FIGS. 3A and 3B are plan views showing the hard disk apparatus of the first embodiment in operation.
Figure 3B:
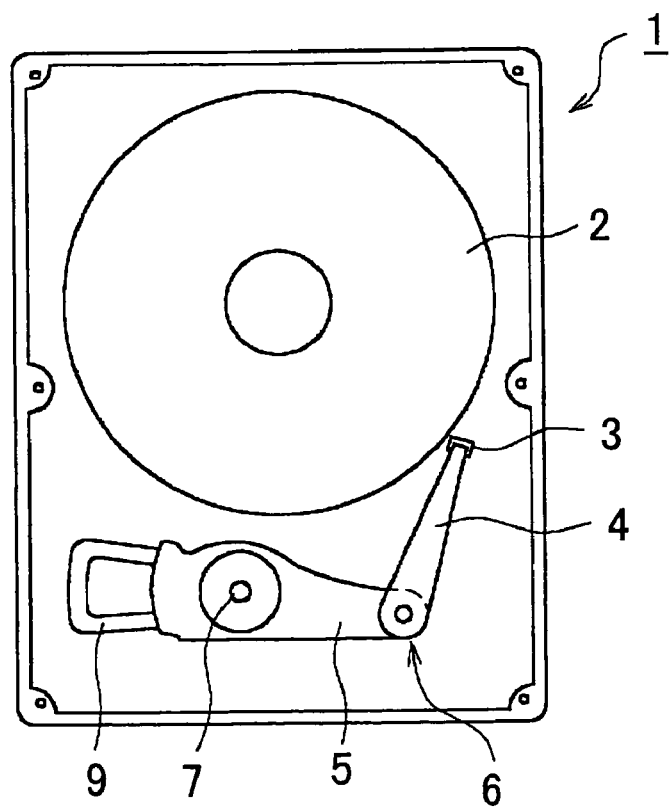

FIGS. 3A and 3B are plan views showing an example of the hard disk apparatus of the first embodiment in operation. In FIG. 3A, the head actuator 6 is rotated so that the magnetic heads 3 are moved to the innermost portion of the disk 2, and in FIG. 3B, the head actuator 6 is rotated so that the magnetic heads 3 are moved away from above the disk 2.

By having the suspensions 4 attached at an angle with respect to the direction in which the arm 5 extends so as to be closer to the disk 2, the head actuator 6 is given the shape of an approximate L as viewed from above. Thus, as shown in FIG. 3A, even when the head actuator 6 is rotated to a point where the magnetic heads 3 are positioned at the innermost portion of the disk 2, the tip of the arm 5 does not interfere with the disk 2.

Thus, the tip of the arm 5 can be configured in a single block, and a configuration in which the two suspensions 4 are attached such that the tip of the arm 5 is held by and between these suspensions 4 from above and below can be adopted.

Figure 4:
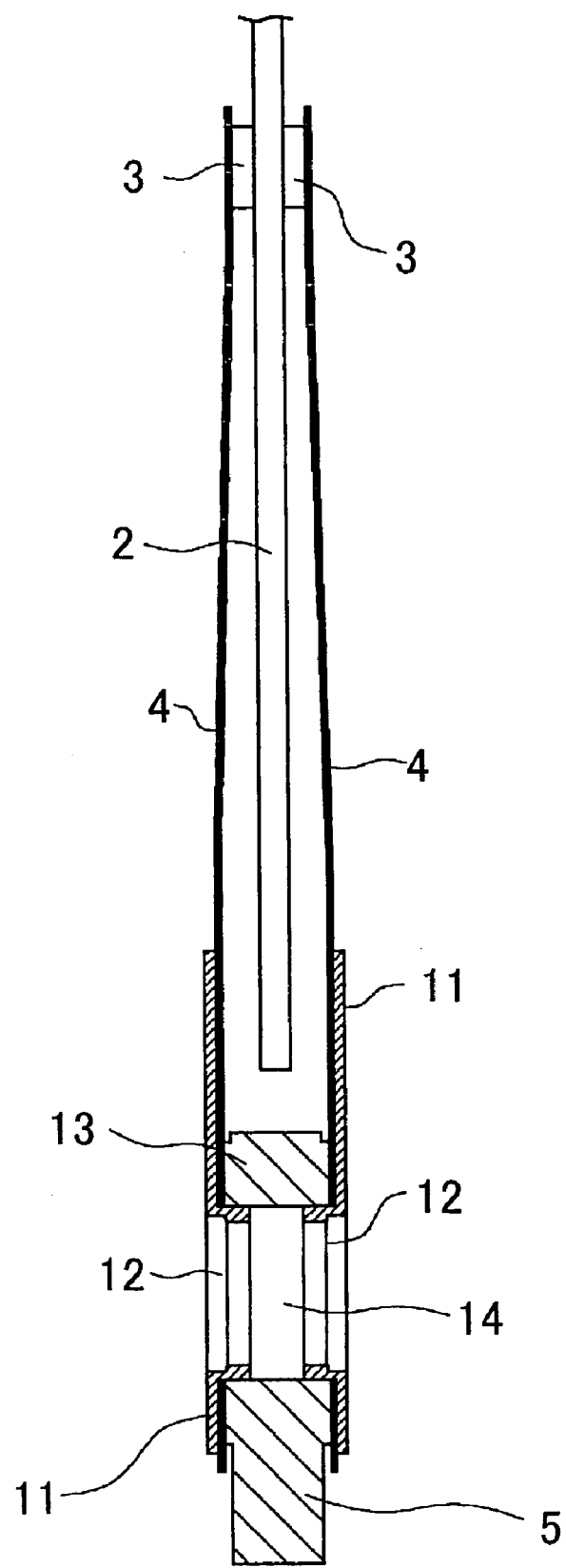
FIG. 4 is a sectional view showing a configuration example of the main portion of the head actuator in the embodiment above.
Figure 5A:
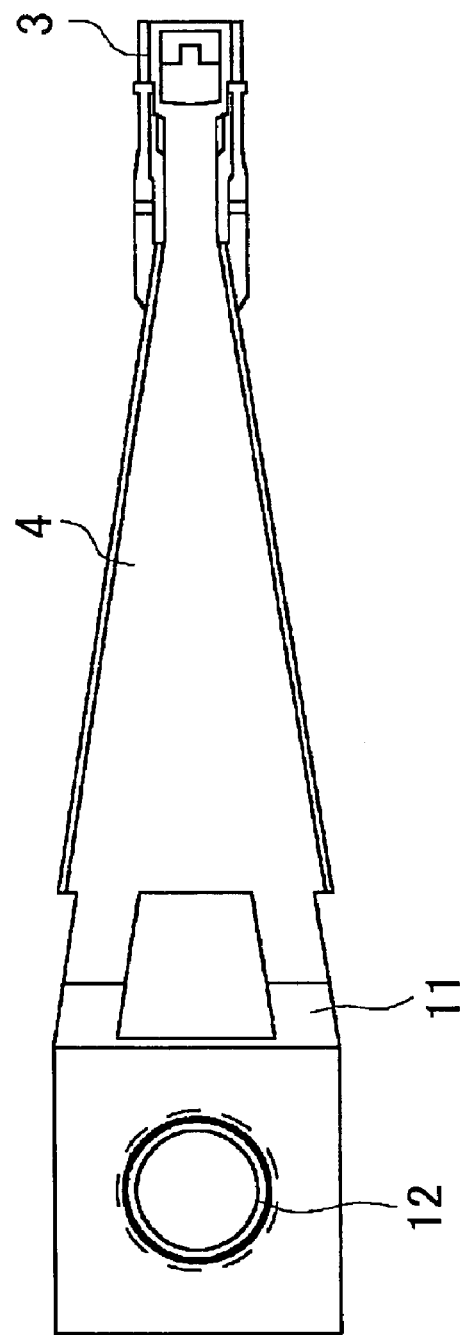
FIGS. 5A and 5B are diagrams illustrating a configuration example of a suspension in the embodiment above.
Figure 5B:
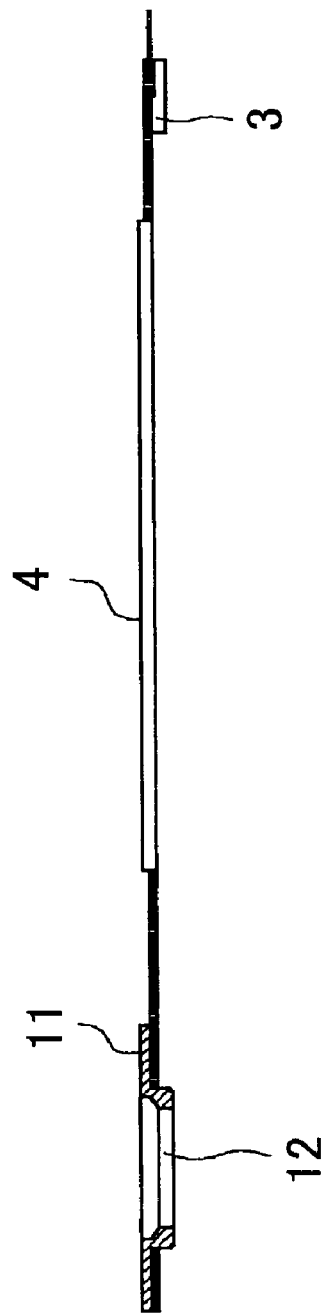

Next, with reference to FIGS. 4, 5A and 5B, the mechanism for attaching the suspensions 4 to the arm 5 in the head actuator 6 described above will be described. FIG. 4 is a sectional view showing a configuration example of the main portion of the head actuator 6 of the present embodiment, and is a sectional view along line B–B in FIG. 3. In addition, FIGS. 5A and 5B are diagrams for illustrating a configuration example of the suspensions in the present embodiment, where FIG. 5A is a plan view and FIG. 5B is a sectional view from the side. In FIGS. 5A and 5B, there is shown the suspension 4 before being attached to the arm 5.

As shown in FIGS. 5A and 5B, the suspension 4 has the magnetic head 3 attached towards the tip thereof, and a base plate 11 is integrally attached to the other end of the suspension 4 through spot welding or the like. A boss 12 for fixing is provided in the base plate 11. This boss 12 is a cylindrical protrusion, and protrudes towards the side on which the magnetic head is provided. The protruding tip section of the boss 12 is formed so as to be thicker than the other portions thereof.

As shown in FIG. 4, a suspension fixing section 13 is provided on the tip side of the arm 5, and a hole 14 to which the bosses 12 of the base plates 11 that are integrated with the suspensions 4 are attached is formed in the suspension fixing section 13. The suspension fixing section 13 is configured in a single block, and the hole 14 penetrates the arm 5 from the upper surface through the lower surface, and has a diameter that is substantially the same as the outer diameter of the boss 12.

Then, the boss 12 of one of the suspensions 4 is inserted into the hole 14 from the upper end thereof, and the boss 12 of the other suspension 4 is inserted into the hole 14 from the lower end thereof. By caulking the tip section of each of the bosses 12, the two suspensions 4 are fixed to the suspension fixing section 13 such that the arm 5 is held by the suspensions 4 from above and below. In addition, the suspensions 4 may be fixed to the arm 5 using an adhesive.

In the present embodiment, because the arm 5 has its suspension fixing section 13 configured in a single block, a higher degree of rigidity can be obtained as compared to a head actuator with an arm whose cross-sectional form is bifurcated as is conventional. With such a head actuator 6 with a more rigid arm 5, the positioning accuracy of the magnetic heads 3 is improved, and is more advantageous in terms of the performance of the drive.

Figure 6:
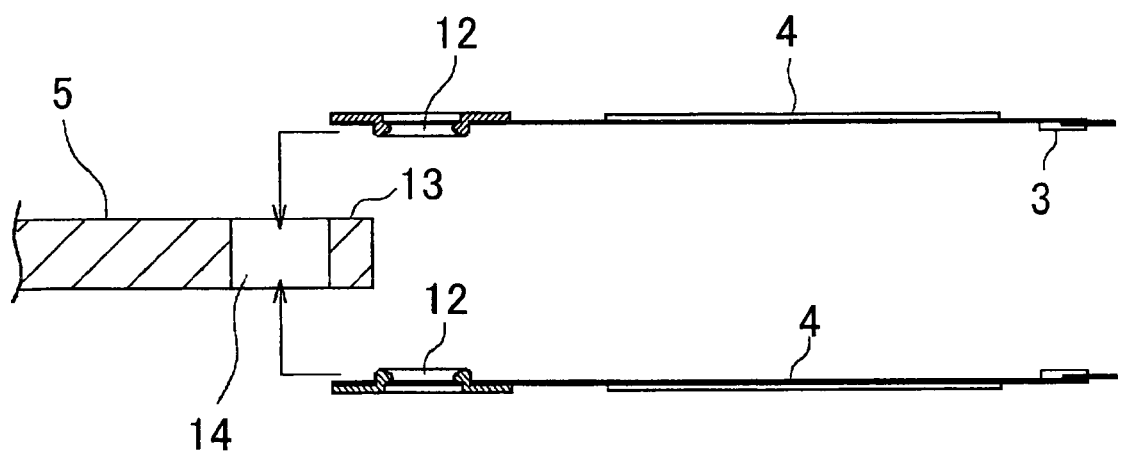
FIG. 6 is a diagram illustrating an example of an attachment process for the suspensions in the embodiment above.

Next, with reference to FIGS. 6 and 7, a method of fixing the suspensions 4 in place in the head actuator 6 will be described as an embodiment of a method of manufacturing a head actuator. FIG. 6 is a diagram illustrating an example of an attachment process of the present embodiment for the suspensions 4, and FIG. 7 is a diagram illustrating an example of a fixing process of the present embodiment for the suspensions 4.

As shown in FIG. 6, the two suspensions 4 have their bosses 12 face each other, and the boss 12 of one of the suspensions 4 is inserted into the hole 14 from the upper end thereof, and the boss 12 of the other suspension 4 is inserted into the hole 14 from the lower end thereof. Thus, the arm 5 is held between the two suspensions 4.

Figure 7:
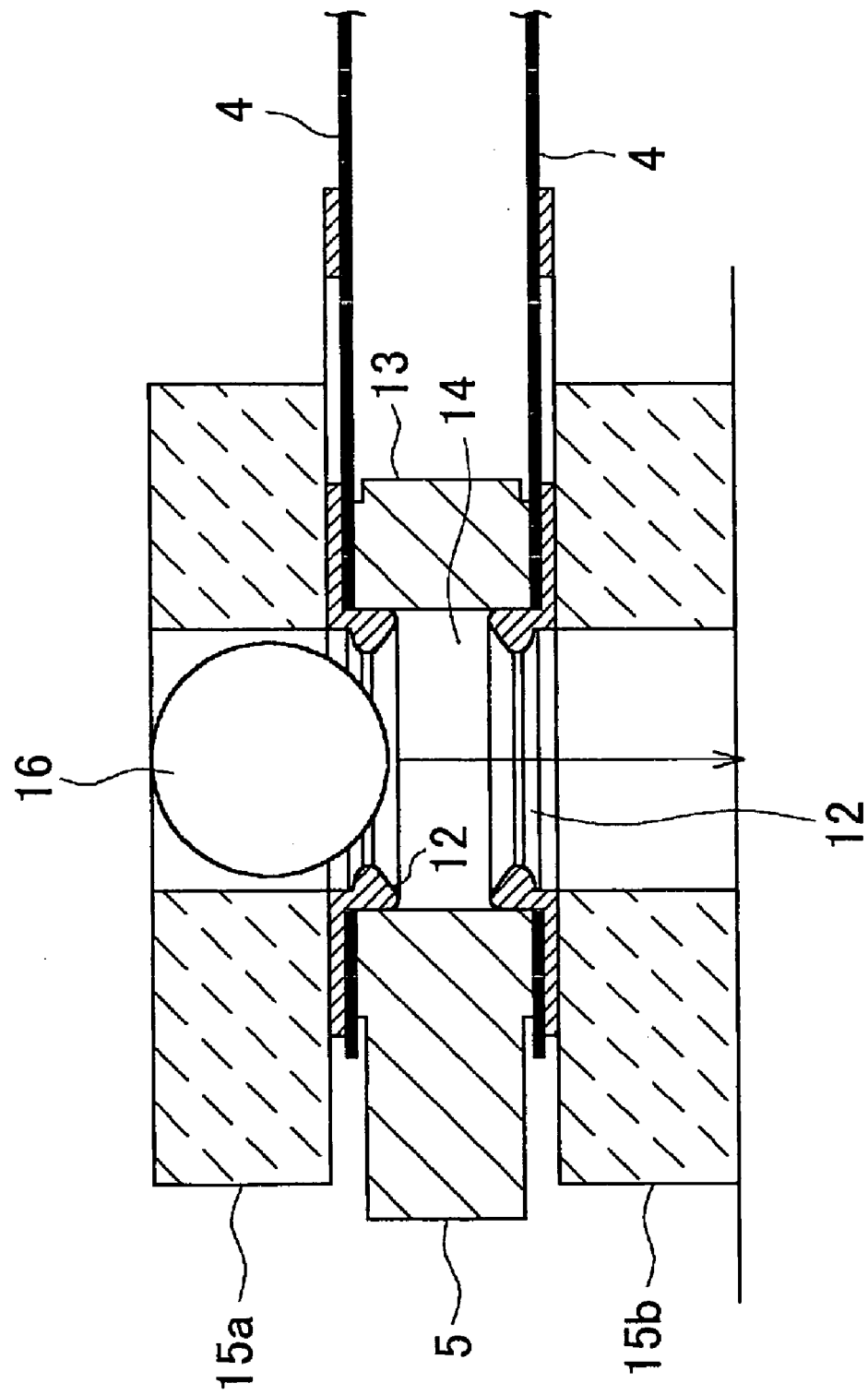
FIG. 7 is a diagram illustrating an example of a fixing process for the suspensions in the embodiment above.

Next, as shown in FIG. 7, the arm 5, to which the suspensions 4 are attached as described with reference to FIG. 6, is set between support member 15a and 15b. Since there is present, between the two suspensions 4 held between the support members 15a and 15b, the suspension fixing section 13 of the arm 5 configured in a single block, a support member is unnecessary between the suspensions 4.

After the arm 5, to which the suspensions 4 are attached, is set between the support members 15a and 15b, a caulking ball 16, whose diameter is slightly larger than the diameter of the tip section of the bosses 12, is penetrated from inside of the upper boss 12 down through to the inside of the lower boss 12. The cross section of the bosses 12 is such that the tip section is formed thicker than the other portions, and this thicker portion protrudes inward. Thus, when the caulking ball 16 passes therethrough, the tip portion of the bosses 12 is deformed outward, and the suspensions 4 are fixed to the arm 5.

Since the arm 5 of the present embodiment is more rigid than the conventional bifurcated arm as described above, deformation after caulking can be suppressed to a minimum. In addition, because the suspension fixing section 13 of the arm 5 is formed in a single block, an intermediate support member, which was conventionally required, becomes unnecessary.

Figure 13A:
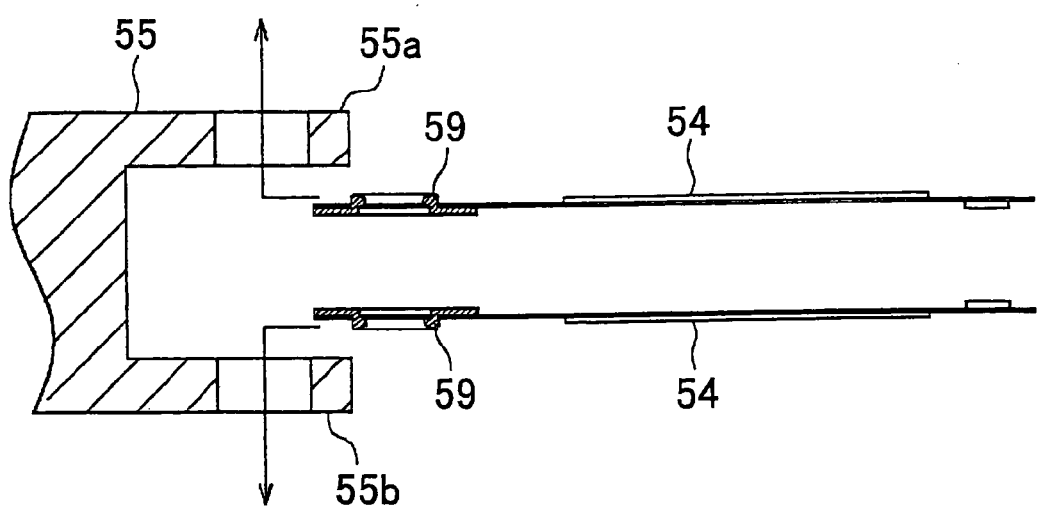
FIGS. 13A and 13B are diagrams illustrating an example of a conventional fixing process.
Figure 13B:
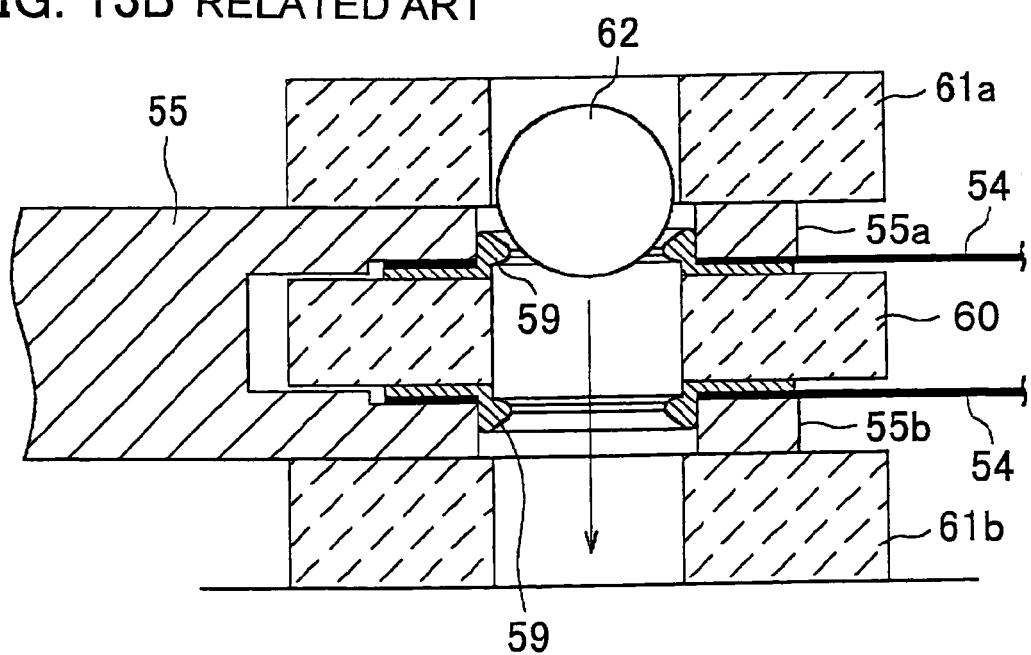

As described with reference to FIG. 13, the intermediate support member 60 is used by being inserted between the suspensions 54 (which correspond to the suspensions 4 in the present embodiment) like a wedge, and not using this intermediate support member 60 means that the handling of the magnetic heads 3 can be simplified, that the caulking process can be made more efficient, and that a reduction in cost can be achieved. In addition, by making the intermediate support member, which is limited in terms of its thickness in comparison with the support members 15a and 15b, and whose strength is lower, the attachment accuracy of the suspensions 4 can also be improved. Further, defects resulting from deformation of the arm 5 due to lack of strength of the support member can be reduced.

As described above, in the hard disk apparatus 1 of the first embodiment, by having the head actuator 6 have a shape that is bent in an approximate L, interference between the arm 5 and the disk 2 when the magnetic heads 3 are moved to the inner areas of the disk 2 can be avoided. Thus, the two suspensions 4 can be attached so that they hold the tip of the arm 5 formed in a single block between themselves, and it becomes possible to make the head actuator 6 thinner. Therefore, the hard disk apparatus 1 can be made thinner.

Figure 8:
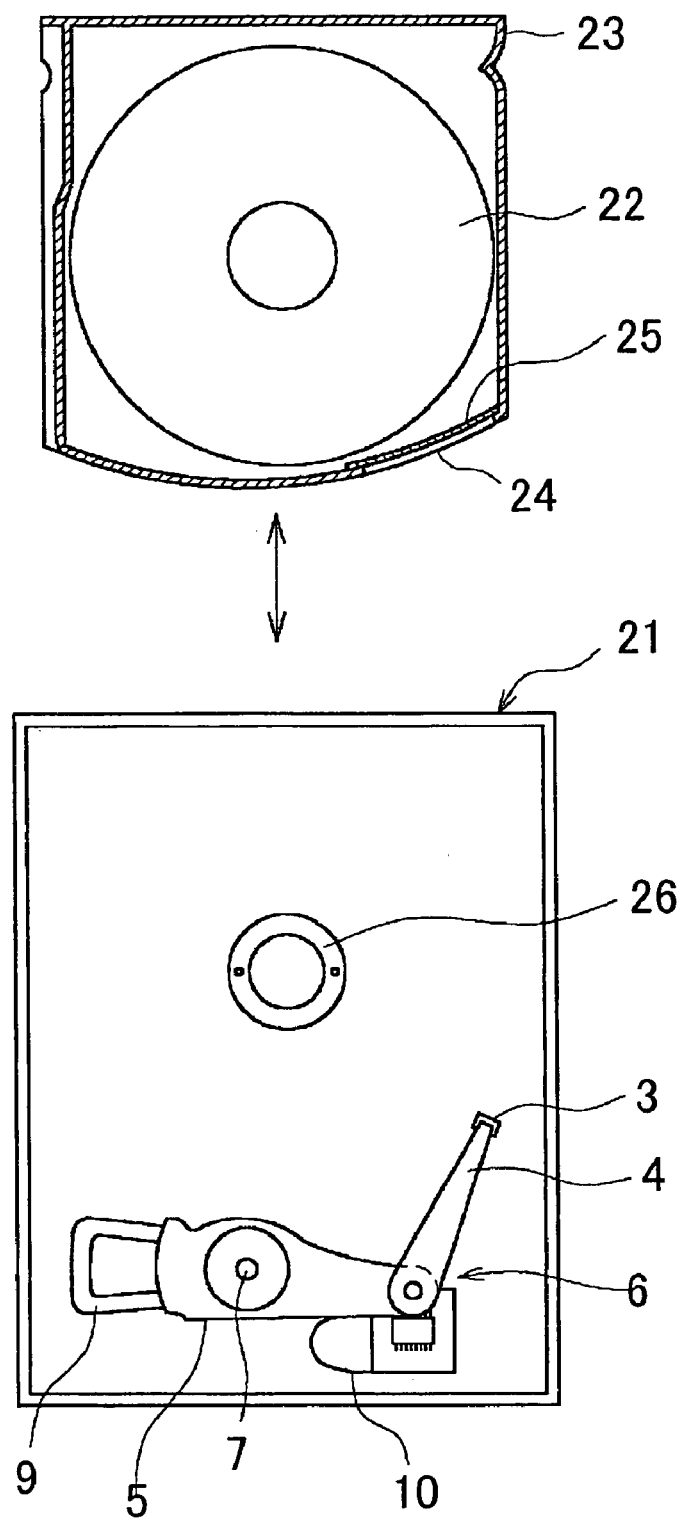
FIG. 8 is a plan view showing a configuration example of a hard disk apparatus of a second embodiment.
Figure 9:
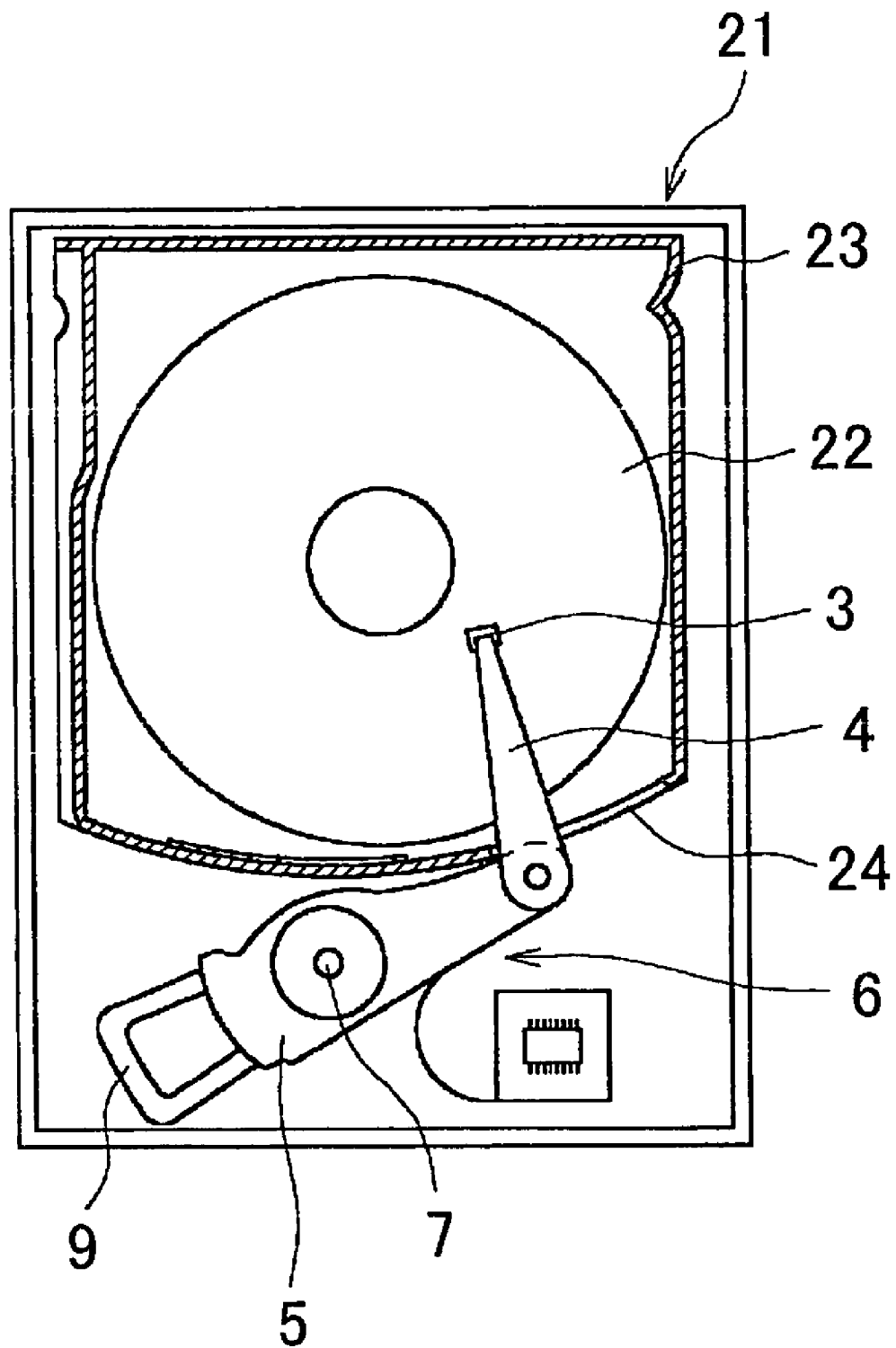
FIG. 9 is a plan view showing the hard disk apparatus of the second embodiment in operation.

Next, with reference to FIGS. 8 and 9, a hard disk apparatus of a second embodiment will be described. FIG. 8 is a plan view showing a configuration example of the hard disk apparatus of the second embodiment, and FIG. 9 is a plan view showing an example of the hard disk apparatus of the second embodiment in operation. In FIGS. 8 and 9, in order to describe the internal structure of the hard disk apparatus, the hard disk apparatus is shown with a cover, which is not shown in the drawings, removed. In addition, components with the same or similar configurations as in the hard disk apparatus 1 of the first embodiment will be described with like reference numerals designated thereto.

A hard disk apparatus 21 of the second embodiment is one in which the head actuator 6 described in the first embodiment is incorporated into a removable HDD (hard disk drive) in which a disk cartridge 23 housing a disk 22 is made freely removable from the hard disk apparatus 21.

The disk cartridge 23 has the shape of a shallow box, and has an opening section 24 in one of the side surfaces. A shutter 25 that can be freely opened and closed is provided at the opening section 24, and by closing the opening section 24 with this shutter 25 when the disk cartridge is removed from the hard disk apparatus 21, the disk 22 inside the disk cartridge 23 is protected.

The hard disk apparatus 21 is equipped with a mechanism, which is not shown in the drawings, for making the disk cartridge 23 freely removable, a spindle motor 26 for rotating the disk 22 inside the disk cartridge 23, and the like.

The head actuator 6 is attached in such a manner that the arm 5 is rotatable with respect to the housing 8 with the pivot 7 at the center. The head actuator 6 is rotated by the voice coil motor 9 that is provided on the side of the pivot 7 opposite the side on which the suspensions 4 are provided. The supplying of power to the head actuator 6 and the communication of signals with the magnetic heads 3 are performed via the flexible printed board 10 fixed to the arm 5.

By having the suspensions 4 attached at an angle with respect to the direction in which the arm 5 extends so as to be closer to the disk 2, the head actuator 6 is given the shape of an approximate L as viewed from above. The suspensions 4 of the head actuator 6 are what goes inside the disk cartridge 23 through the opening section 24. Thus, as shown in FIG. 8, even when the head actuator 6 is rotated to a point where the magnetic heads 3 are positioned at the innermost portion of the disk 22, the tip of the arm 5 does not interfere with the disk 22.

Thus, the tip of the arm 5 can be configured in a single block, and the head actuator 6 can be made thinner. The fixing structure for the suspensions 4 is the same as the one described with reference to FIGS. 4 and 5, where the suspension fixing section 13 is provided on the tip side of the arm 5, and the hole 14 for attaching the bosses 12 of the base plates 11 that are integrated with the suspensions 4 is formed in the suspension fixing section 13. The suspension fixing section 13 is configured in a single block, the hole 14 penetrates the arm 5 from the upper surface through the lower surface, and has a diameter that is substantially the same as the outer diameter of the bosses 12.

Then, the boss 12 of one of the suspensions 4 is inserted into the hole 14 from the upper end thereof, and the boss 12 of the other suspension 4 is inserted into the hole 14 from the lower end thereof. By caulking the tip section of each of the bosses 12, the two suspensions 4 are fixed to the suspension fixing section 13 such that the arm 5 is held by the suspensions 4 from above and below.

Figure 10:
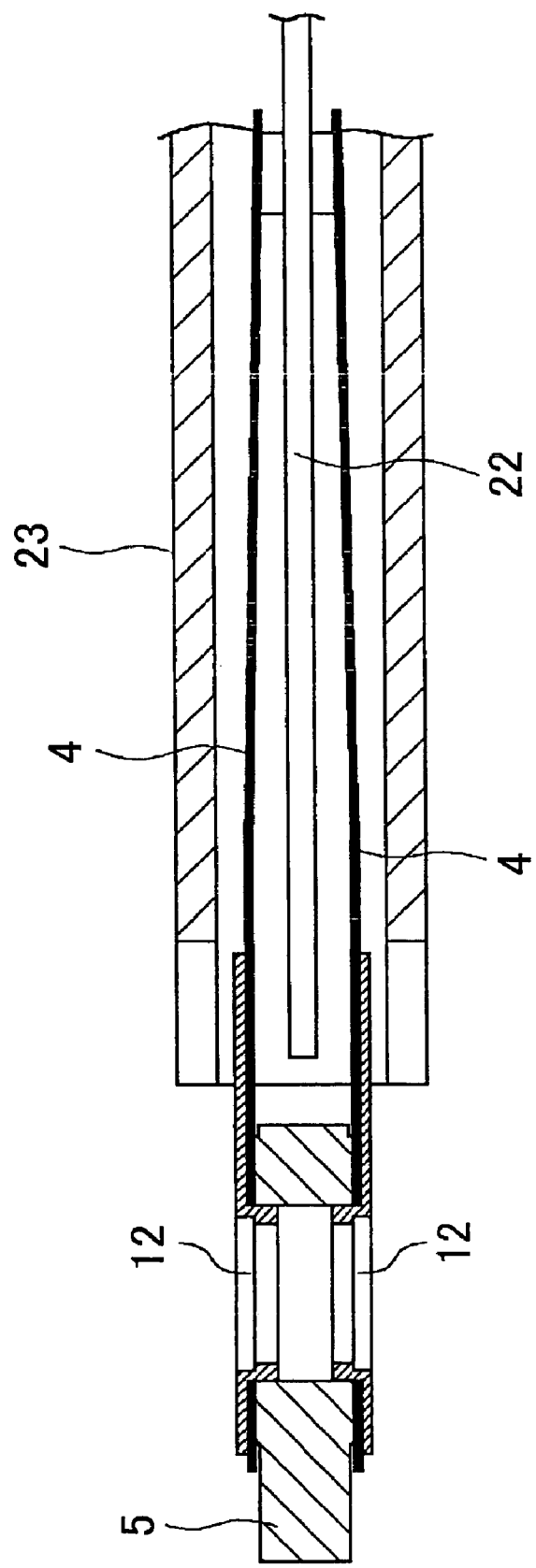
FIG. 10 is a sectional view showing a configuration example of the main portion of the hard disk apparatus of the second embodiment.
Figure 11A:
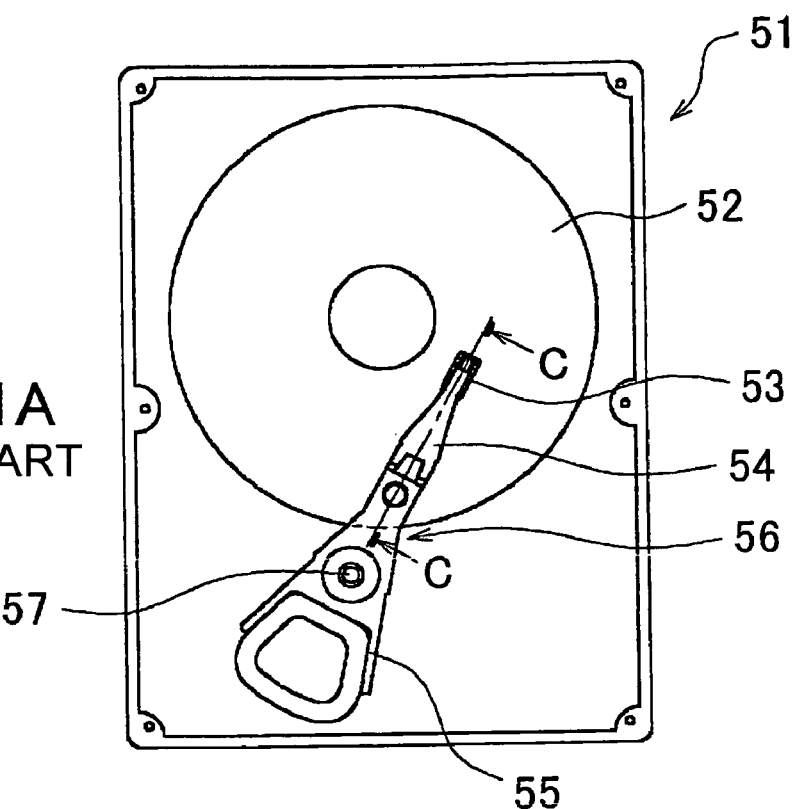
FIGS. 11A and 11B are plan views showing configuration examples of conventional hard disk apparatuses.
Figure 11B:
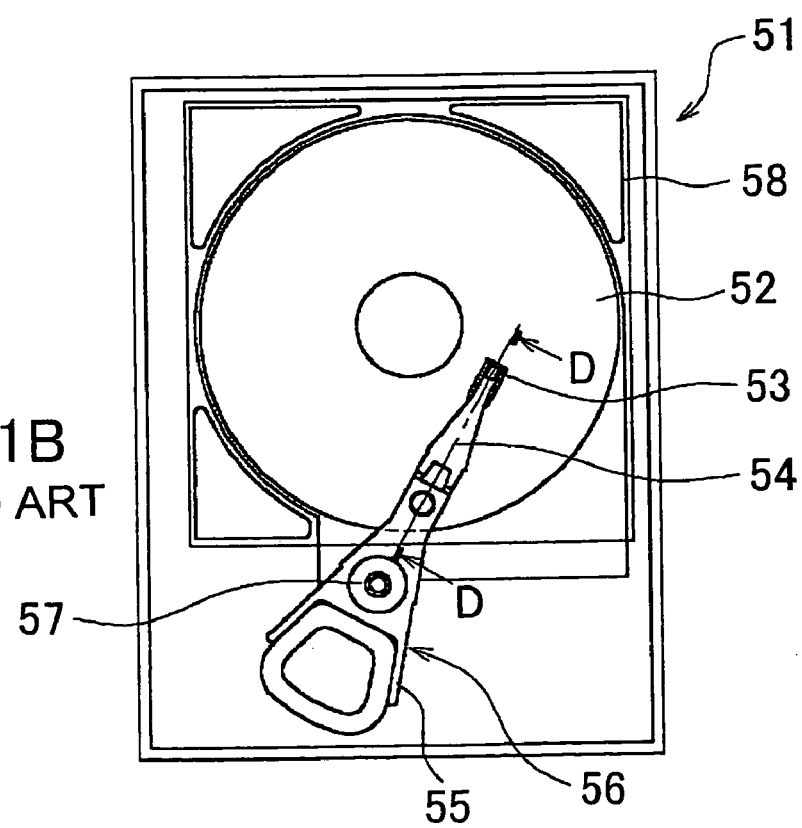
Figure 12:
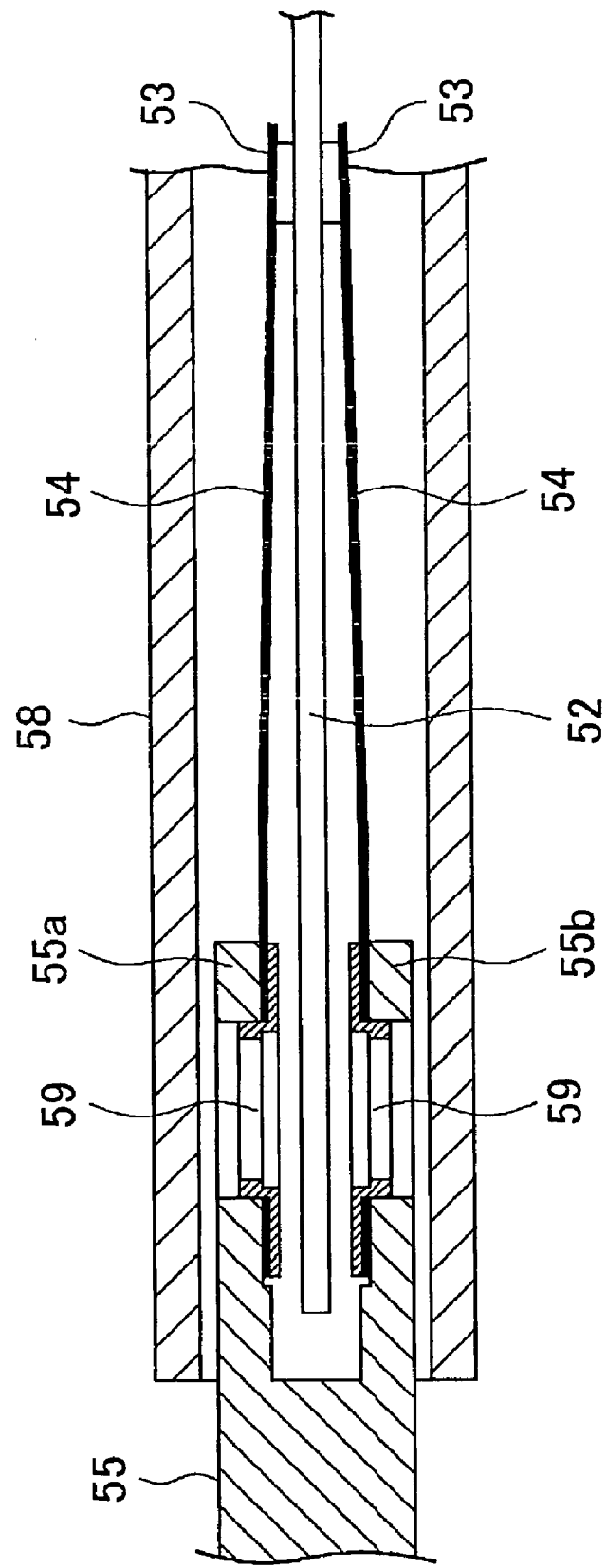
FIG. 12 is a sectional view showing a configuration example of the main portion of a conventional hard disk apparatus.

FIG. 10 is a sectional view showing a configuration example of the main portion of the hard disk apparatus of the second embodiment. As described with reference to FIG. 12, in the conventional hard disk apparatus 51, since a groove section for evading the disk 52 is provided at the tip of the arm 55, the arm 55 had such a shape in which the tip thereof was bifurcated. Thus, the arm 55 was made thicker, and because the arm 55 is to enter the disk cartridge 58, the disk cartridge 58 also had to be thicker.

As opposed thereto, as shown in FIG. 10, in the hard disk apparatus 21 of the second embodiment, by making the head actuator 6 have a shape that is bent in the shape of an approximate L, interference between the arm 5 and the disk 22 is avoided, the tip of the arm 5 can be configured in a single block, and the arm 5 is made thinner. In addition, because only the suspensions 4 enter the disk cartridge 23, it becomes possible to make the disk cartridge 23 thinner.

Referring back to FIG. 9, by making the head actuator 6 be bent in the shape of an approximate L, the suspensions 4 end up entering the disk cartridge 23 from a direction that is substantially orthogonal to the opening section 24. As a result, the opening section 24 can be made smaller.

If the opening section 24 of the disk cartridge 23 that is removable from the hard disk apparatus 21 can be made smaller, a highly reliable disk cartridge that is superior in terms of its anti-dust qualities can be provided.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A head actuator adapted for use with a hard disk apparatus operative to rotate a disk, comprising:
an arm having a rotary drive section and including an arm pivot portion and an arm tip portion disposed apart from the arm pivot portion, the arm extending generally longitudinally;
two plate shaped elastic members attached towards the arm tip portion of said arm with a gap between each other, each elastic member extending generally longitudinally;
a magnetic head supported at a tip end portion of each of said elastic members;
a boss on the other end of each of said elastic members that protrudes in the direction of the side on which said magnetic head is provided; and
a fixing section, which has a hole into which said bosses are inserted, formed on the arm tip portion of said arm, wherein
said boss of one of said elastic members is inserted into said hole from one end section thereof, and said boss of the other elastic member is inserted into said hole from the other end section thereof so as to have said fixing section held and fixed between said elastic members, and said elastic members are attached to said arm at an obtuse angle on the arm tip portion with respect to the direction in which said arm extends to form a generally L-shaped configuration, wherein, when the rotary drive section pivots the arm at the pivot portion, the arm, the elastic members and the magnetic heads pivot about a pivot axis in a manner that, in an operative state, forward portions of the elastic members and magnetic heads move to and between an outer periphery of the disk and a radially inner portion of the disk with the disk positioned in the gap between the magnetic heads while the arm, the fixing section, the bosses and rearward portions of the elastic members remain outside of the outer periphery of the disk and, in a non-operative state, the elastic members, the magnetic heads, the fixing section, the bosses and the arm are positioned outside the outer periphery of the disk.

2. The head actuator according to claim 1, wherein said elastic members are fixed to said fixing section of said arm by caulking said bosses.

3. The head actuator according to claim 1, wherein said elastic members are fixed to said fixing section of said arm by an adhesive.

4. A hard disk apparatus operative to rotate a disk, comprising:

a head actuator in which two plate shaped elastic members are attached, with a gap between themselves, towards the tip of an arm having a rotary section and including an arm pivot portion and an arm tip portion disposed apart from the arm pivot portion, the arm extending generally longitudinally, a magnetic head is attached to the tip of each of said elastic members, and said magnetic heads are positioned on both sides of the disk;

a boss provided on the other end of each of said elastic members that protrudes in the direction of the side on which said magnetic head is provided; and a fixing section, which has a hole into which said bosses are inserted, formed towards the arm tip portion of said arm, wherein said boss of one of said elastic members is inserted into said hole from one end section thereof, and said boss of the other elastic member is inserted into said hole from the other end section thereof so as to have said fixing section held and fixed between said elastic members, and said head actuator has a shape in which said elastic members are attached to said arm at the arm tip portion at an obtuse angle with respect to the direction in which said arm extends so that said elastic members are inclined towards said disk to form a generally L-shaped configuration, wherein, when the rotary section pivots the arm pivot portion, the arm, the elastic members and the magnetic heads pivot about a pivot axis in a manner that, in an operative state, forward portions of the elastic members and the magnetic heads move to and between an outer periphery of the disk and a radially inner portion of the disk with the disk positioned in the gap between the magnetic heads while the arm, the fixing section, the bosses and rearward portions of the elastic members ramain outside of the outer periphery of the disk and, in a non-operative state, the elastic members, the magnetic heads, the fixing section, the bosses and the arm are positioned outside the outer periphery of the disk.

5. The hard disk apparatus according to claim 4, wherein said elastic members are fixed to said fixing section of said arm by caulking said bosses.

6. The hard disk apparatus according to claim 4, wherein said elastic members are fixed to said fixing section of said arm by an adhesive.

7. The hard disk apparatus according to claim 4, wherein said disk is housed in a disk cartridge, and is freely removable from said apparatus.

* * * * *

UNITED STATES PATENT AND TRADEMARK OFFICE
CERTIFICATE OF CORRECTION

PATENT NO.       : 7,164,559 B2                                    Page 1 of 1
APPLICATION NO.  : 10/684459
DATED            : January 16, 2007
INVENTOR(S)      : Kazuyuki Yamamoto et al.

It is certified that error appears in the above-identified patent and that said Letters Patent is hereby corrected as shown below:

<u>Column 10, Line 27:</u>

"ramain" should read --remain--

Signed and Sealed this

Fourth Day of September, 2007

JON W. DUDAS
*Director of the United States Patent and Trademark Office*